April 3, 1962 R. THOMAS 3,028,190
GRIPPING TOOL JAWS
Filed March 4, 1958
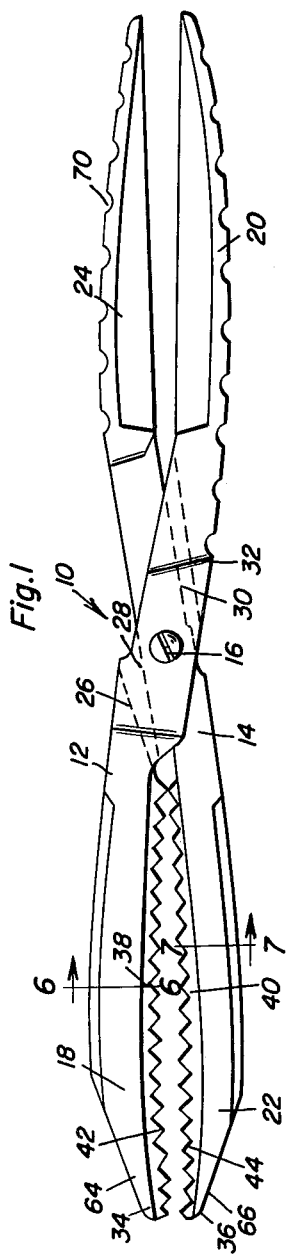
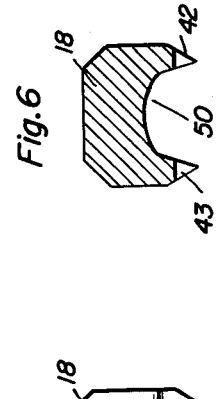
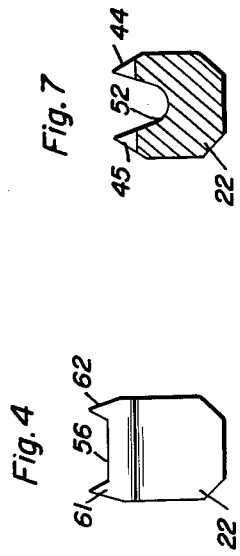
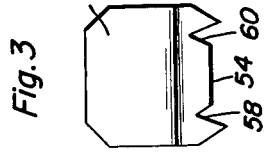
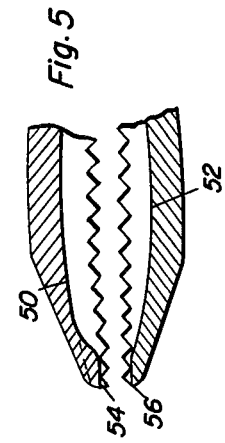
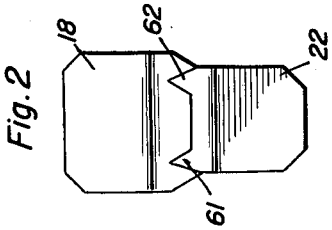
Ralph Thomas
INVENTOR.
BY Clarence A. O'Brien
and Harvey B. Jacobson
Attorneys

United States Patent Office 3,028,190
Patented Apr. 3, 1962

3,028,190
GRIPPING TOOL JAWS
Ralph Thomas, 47 Clifton St., West Haven, Conn.
Filed Mar. 4, 1958, Ser. No. 719,122
4 Claims. (Cl. 294—118)

This invention relates in general to tool jaws and more particularly to a novel and improved kind of gripping tool particularly adapted for utilization with fish.

Fishing has become undoubtedly one of the most popular forms of diversion for the American population. The sport or activity of fishing for most hobbyists includes the activity of fishing itself, that is, with rod and reel, etc., and further includes the removal of the fish from the hook, the preparation of the fish for eating, and the utilization of the fish. In accordance with these latter activities, a plurality of tools must be utilized in order to hold and remove the hook from the fish without touching the fish, for gutting, scaling, and for generally handling the caught fish. The development of a single tool to accomplish this plurality of functions would obviously aid the fisherman in the expeditious handling of his catch. It would further remove a portion of the unpleasantness from the less satisfying portion of the fishing activity. It is therefore the principal object of this invention to provide a novel and improved tool particularly adapted to easily and efficiently handle caught fish.

It is a further object of this invention to provide a novel and improved tool for handling fish which is further capable of gutting and scaling the fish.

And it is a still further object of this invention to provide a novel and improved tool for the handling of the fish which is more efficient and practical than heretofore known devices and further is reliable and relatively inexpensive to manufacture for the intended function.

In accordance with the above stated objects, below is described a novel and improved tool construction adapted for handling fish including a first member and a second member pivotally connected to the first member. Each of the members includes an arcuate jaw portion and a handle portion with the respective jaw portions opposed. Each of the jaw portions carries a pair of spaced parallel rows of upstanding teeth, the teeth of each jaw portion being likewise opposed. The spaced parallel rows are connected by a substantially U-shaped trough portion. The arcuate jaw portions are so constructed that the respective terminals of the jaw portions contact upon a pivotal movement of the members while allowing a portion of the opposed rows of teeth to remain spaced whereby a fish may be held and gripped at the center of the opposed jaw portions. It is further contemplated that one of the members shall be wider than the other of the members with the wider member having a pair of spaced recesses at the terminal jaw portion for the accommodation of the teeth of the opposed terminal jaw portion.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is an elevational side view of the gripping tool comprising this invention;

FIGURE 2 is an elevational front view showing the terminal jaw portions in contact;

FIGURE 3 is an elevational front view of the upper jaw portion;

FIGURE 4 is an elevational front view of the lower jaw portion;

FIGURE 5 is a fragmentary sectional view showing the jaw portion taken substantially along a plane parallel to the general line of the members;

FIGURE 6 is a sectional view taken substantially along the plane 6—6 of FIGURE 1; and FIGURE 7 is a sectional view taken substantially along the plane 7—7 of FIGURE 1.

With continuing reference to the drawing, numeral 10 generally represents the gripping tool comprising this invention and including a first member 12 and second member 14. The members 12 and 14 are pivoted to each other at a point proximate their mid-points by any conventional pivotal means as shown at 16.

The member 12 includes a front jaw portion 18 and a rear handle portion 20. The member 14 includes a corresponding jaw portion 22 opposed to the jaw portion 18 and a corresponding handle portion 24 opposed to the handle portion 20. The member 12 includes a ledge 26 which is adapted to abut ledge 28 on member 14 to prevent excess pivotal movement of the members 12 and 14 relative to each other. Likewise, ledges 30 and 32 are adapted to abut each other.

As is clearly shown in the drawing, each of the jaw portions is arcuate so the terminal portions of the jaws 34 and 36 will contact each other prior to the central portions 38 and 40. This arcuate shape of the jaw portions enables a fish to be gripped between the jaw portions and the fish will naturally tend to be gripped toward the center portions 38 and 40 of the jaw portions. The jaw portions 18 and 22 carry opposed teeth 42 and 44 which are formed at substantially right angles.

Each of the jaw portions carries a pair of spaced parallel rows of teeth as is clearly shown in FIGURE 6 wherein one parallel row is designated at 42 and the second row as 43. FIGURE 7 illustrates the parallel rows 44 and 45. It will be noted that the rows 42 and 43 are connected by substantially U-shaped trough portion 50 while the rows 44 and 45 are connected by substantially U-shaped trough portion 52.

It will be noted in FIGURE 5 that the trough portions 50 and 52 terminate in flat end portions 54 and 56 respectively. The lower member 14 is of a lesser width than the upper member 12. Depressions 58 and 60 are formed on either side of the flat end portion 54. The depressions 58 and 60 are particularly fitted and adapted to accommodate teeth 61 and 62 of the lower jaw portion 22. Likewise, the flat portion 54 is adapted to fit on the flat portion 56 so that when the jaw portions 18 and 22 are closed the front view of the tool appears as in FIGURE 2. It will be appreciated that even when the end portions are tightly closed as in FIGURE 2, the central portion of the jaws 38 and 40 remain spaced as above noted. This enables a fish to be tightly gripped at the center portion.

It will be noted that the forward outer perimeter of the jaw portions 18 and 22 slope forward toward each other as at 64 and 66. This relationship of the jaw portions allows the tool to be utilized for gutting the fish by inserting the tool within the fish in closed position and opening the jaw portions so that 64 and 66 move away from each other carrying portions of the fish so as to open the fish body for gutting. The tool is then closed for gripping the innards to be removed between the flat portions 54 and 56 and between the laterally adjacent teeth in an obvious manner.

The handle portions 20 and 24 are further particularly designed so as to enable the fisherman to exercise a sure grip on the tool. The sure grip is made certain by the utilization of depressions as at 70 for allowing for greater frictional engagement between the hands and the handle portions.

In summary, what has been described is a new and improved construction in gripping tools particularly adapted and capable of handling fish. The particular features of this invention adapt the tool for use as a spreader and emergency plier. These functions are accomplished by the particular construction of the forward terminals of the jaw portions. Likewise, these terminals are used as shot squeezers or may be utilized for gutting.

The specially shaped jaws allow the tool to be utilized for scaling the fish and further provide a positive non-slip fish gripper enabling the fisherman to remove a fishhook from the fish without touching the fish. The particular jaw shape allows the tool to hold eels and flat or round bellied fish while absolutely assuring no slip.

Still further, the novel handle construction provides a secure frictional engagement so that a good squeeze grip is provided with a minimum of effort. The device is therefore especially adaptable for use by women. Still further, it is noted that because no particular finger indentations have been provided on the handles, the tool may be utilized in any position in which it might be picked up.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An improved fish utility tool for gripping, gutting and scaling fish and pulling fish hooks, comprising a first solid elongated member, a second solid elongated member, said members being of equal length and pivotally connected to each other proximate their mid-points, each of said members including an arcuate jaw portion defining a curve in the longitudinal plane of said mmebers and a handle portion, said jaw portions being opposed to one another and said handle portions being opposed to one another, each of said jaw portions having formed thereon a series of inwardly projecting teeth extending along an arcuate path, said jaw portions each defining a terminal remote from said pivotal connection, said arcuate jaw portions being bowed away from each other proximate their longitudinal centers for facilitating the gripping of a fish therebetween, said series of teeth on each of said jaw portions including a pair of spaced parallel rows, said rows being connected by a substantially U-shaped trough portion, said first member jaw portion being wider than said second member jaw portion, said first member jaw portion terminal defining a flat transverse surface having a pair of transversely spaced recesses at either end thereof, said second member jaw portion terminal defining a flat transverse surface having a pair of transversely spaced teeth at either end thereof for gutting a fish, said spaced teeth receivable in said spaced recesses with said flat surfaces engaged with each other for gripping objects therebetween.

2. The combination of claim 1 wherein said members are free from any connection other than said pivotal connection whereby said jaw portions may be pivoted away from each other to an extreme position allowing one of the jaw portions to be drawn across a fish for scaling said fish.

3. The combination of claim 1 wherein said jaw portions define outer sloping and forwardly converging end surfaces whereby the extreme forward ends of said jaw portions may be inserted into an opening in a fish for spreading said fish to increase the size of said opening to facilitate gutting of said fish.

4. The combination of claim 1 wherein said handle portions includes spaced depressions therein, said depressions facilitating the manual gripping of said handle portions.

References Cited in the file of this patent

UNITED STATES PATENTS

| | | |
|---|---|---|
| 198,678 | Poole | Dec. 25, 1877 |
| 2,531,987 | Pilliod | Nov. 28, 1950 |
| 2,578,344 | Everett | Dec. 11, 1951 |
| 2,643,151 | Zupancic | June 23, 1953 |
| 2,653,844 | Detwiler | Sept. 29, 1953 |
| 2,668,538 | Baker | Feb. 9, 1954 |
| 2,768,856 | Wright | Oct. 30, 1956 |